United States Patent
Tanaka

(10) Patent No.: US 7,835,376 B2
(45) Date of Patent: Nov. 16, 2010

(54) COMMUNICATION DEVICE, COMMUNICATION SYSTEM, AND LAG MANAGEMENT TABLE MANAGEMENT METHOD USED THEREFOR

(75) Inventor: Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 12/055,165

(22) Filed: Mar. 25, 2008

(65) Prior Publication Data
US 2008/0240133 A1 Oct. 2, 2008

(30) Foreign Application Priority Data
Mar. 28, 2007 (JP) .............................. 2007-083214

(51) Int. Cl.
H04L 12/56 (2006.01)

(52) U.S. Cl. .................. 370/401; 370/390; 709/242

(58) Field of Classification Search ................ 370/386, 370/387, 390, 235, 400, 401, 428, 429, 217, 370/218, 225; 709/242
See application file for complete search history.

(56) References Cited

U.S. PATENT DOCUMENTS

| | | | | |
|---|---|---|---|---|
| 5,687,168 A * | 11/1997 | Iwata | ........................... | 370/255 |
| 6,167,025 A * | 12/2000 | Hsing et al. | .................. | 370/216 |
| 6,226,263 B1 * | 5/2001 | Iwase et al. | .................. | 370/231 |
| 6,823,395 B1 * | 11/2004 | Adolfsson | .................... | 709/242 |
| 7,088,717 B2 * | 8/2006 | Reeves et al. | ................ | 370/392 |
| 7,190,696 B1 * | 3/2007 | Manur et al. | ................. | 370/392 |
| 7,242,686 B1 * | 7/2007 | Dougherty et al. | ....... | 370/395.4 |
| 7,289,513 B1 * | 10/2007 | Medved et al. | ......... | 370/395.31 |
| 7,433,351 B1 * | 10/2008 | Pelissier et al. | ............. | 370/389 |
| 7,580,407 B2 * | 8/2009 | Shimada | ..................... | 370/389 |
| 7,590,126 B2 * | 9/2009 | Shimada | ..................... | 370/401 |
| 7,697,525 B2 * | 4/2010 | Zelig et al. | ................... | 370/390 |
| 2002/0097683 A1 * | 7/2002 | Yamamoto et al. | .......... | 370/242 |
| 2003/0147387 A1 * | 8/2003 | Devi et al. | .................. | 370/390 |
| 2006/0007946 A1 * | 1/2006 | Kastenholz et al. | ......... | 370/401 |
| 2006/0013240 A1 * | 1/2006 | Ma et al. | ..................... | 370/401 |
| 2007/0268915 A1 * | 11/2007 | Zelig et al. | ................... | 370/401 |
| 2008/0151890 A1 * | 6/2008 | Zelig et al. | ................... | 370/390 |
| 2009/0135838 A1 * | 5/2009 | Rouyer et al. | ............... | 370/401 |
| 2009/0225752 A1 * | 9/2009 | Mitsumori | .................. | 370/390 |

FOREIGN PATENT DOCUMENTS

| | | |
|---|---|---|
| JP | 2006295934 A | 10/2006 |
| JP | 2006295935 A | 10/2006 |

* cited by examiner

*Primary Examiner*—Chi H. Pham
*Assistant Examiner*—Kevin Mew

(57) ABSTRACT

A communication device has link aggregation management tables, one for each of a plurality of line cards, each of the link aggregation management tables managing a relation between a link aggregation group and ports belonging thereto. The communication device has a function, which makes statuses of the link aggregation management tables consistent, in each of the plurality of line cards.

7 Claims, 5 Drawing Sheets

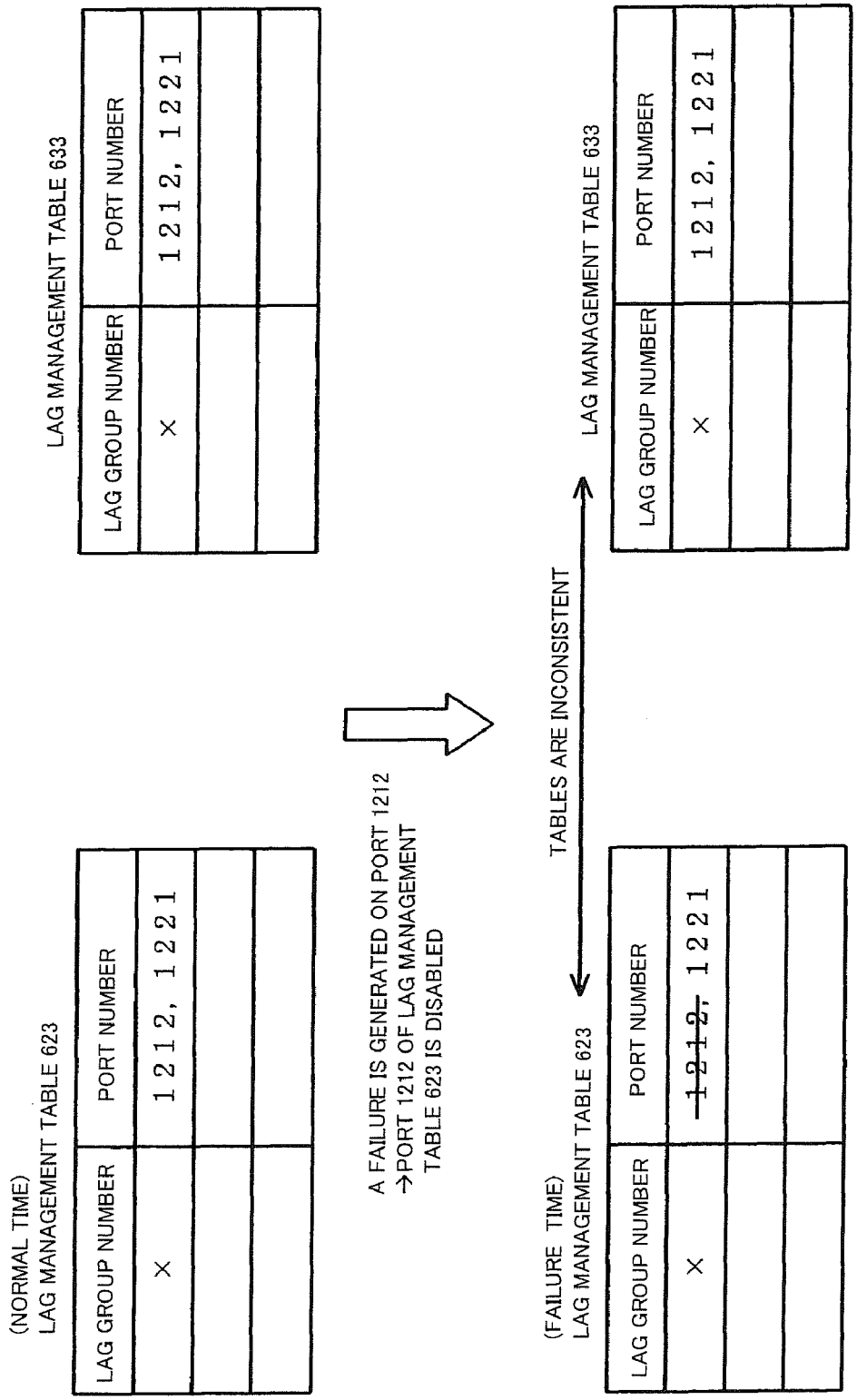

COMMUNICATION DEVICE, COMMUNICATION SYSTEM, AND LAG MANAGEMENT TABLE MANAGEMENT METHOD USED THEREFOR

REFERENCE TO RELATED APPLICATION

The present application is claiming the priority of the earlier Japanese patent application No. 2007-083214 filed on Mar. 28, 2007, the entire disclosure thereof being incorporated herein by reference thereto.

FIELD OF THE INVENTION

The present invention relates to a communication device, a communication system, and a LAG management table management method used for the communication device and the communication system, and more particularly to a communication device having a layer 2 switch function.

BACKGROUND OF THE INVENTION

In general, a layer 2 switch device uses one of two switch architectures: one is a distributed switch architecture in which switching devices are mounted on multiple line cards with a frame switch function distributed on the line cards, and the other is a centralized switch architecture in which one centralized switch card and multiple line cards are used with one switching device provided on the switch card to switch frames from multiple connected line cards in a centralized manner.

The switching device described above includes a search table composed of entries each composed of an address and a port number. In many cases, this search table is managed independently by each switching device.

A link aggregation (hereinafter called LAG) function is a function that aggregates multiple links into one, and a switching device having this LAG function has a table that manages the LAG configuration (hereinafter called a LAG management table). The LAG management table is a table that manages a relation between LAG groups and ports belonging to the LAG groups. As with the search table described above, this LAG management table is included in each switching device in most cases and is managed independently by each switching device.

When the centralized switch architecture is used, the LAG management table is included in the centralized switch card, to which multiple line cards are connected, for integrated management. In this case, a link aggregation extending across two or more line cards can be configured for connection to an external communication device by centralizing the statuses of the ports of the line cards configuring the LAG in the centralized switch card and by managing the statuses of the ports with the use of one LAG management table provided in the centralized switch.

The following describes the above-described operation for a switch device using conventional distributed switch architecture, with reference to FIG. 4 and FIG. 5. Referring to FIG. 4, it is assumed that, when a port 1212 is normal, the port 1212 is selected as the output port of a frame to be sent to a host 4 according to the LAG distribution algorithm.

At this time, if the port 1212 fails as shown in FIG. 4, a LAG management table 623 on a line card 62 is updated from the table at the top (normal time) of FIG. 5 to the table at the bottom (failure time). As a result, a port 1221 is selected as the output port, and a frame is transferred to a line card 63.

However, because a LAG management table 633 on the line card 63, which has a port constituting the same LAG, does not have means for knowing that the port 1212 of the line card 62 has failed, the table is not updated so that the two tables become inconsistent. On the line card 63, because an output port is selected according to the same distribution algorithm as that of the line card 62 based on the LAG management table 633 which is not updated, the failing port 1212 is determined as the output port. This creates a problem in that a frame cannot be sent to a communication device 2.

One of the means for making the status of the LAG management table consistent among multiple line cards is that information (LAG management information) on a status change in the LAG management table (a port entry is disabled when a port belonging to a LAG fails; a port entry is enabled when the port belonging to a LAG recovers) is notified to, or confirmed by, the CPU (Central Processing Unit) 61 to reflect a change in the content of the LAG management table on one line card onto the LAG management table on the other line card.

A LAG is described in the following patent documents.

[Patent Document 1] Japanese Patent Kokai Publication No. JP-P2006-295934A

[Patent Document 2] Japanese Patent Kokai Publication No. JP-P2006-295935A

The following analysis is given by the present invention. The disclosures of the above-mentioned Patent Documents 1-2 are herein incorporated by reference thereto, and regarded as part of the disclosure of the present invention.

When a port constituting a LAG fails in the distributed switch architecture in which there is no centralized switch card as described above, the LAG management tables on all line cards must be updated to make them consistent, to distribute frames only to a normal port.

However, in the distributed switch architecture described above in which the LAG management table on each line card is managed independently, there is no means for notifying the failure status to the line card other than the line card to which the failing port belongs. For this reason, the LAG table cannot be updated and, as a result, an inconsistency exits between the LAG table on the line card to which the failing port belongs and the LAG management table on the other line card. In this case, when the failing port is selected as the output port on a line card other than the line card to which the failing port belongs, frames sometimes cannot be sent. This means that a LAG extending across line cards cannot be built.

The above-described means for making the LAG management table status consistent using the CPU 61 involves software processing by the CPU 61. This software processing has a processing performance problem because it takes time to detect a change in the port status and there is a delay in reflecting a change in the LAG management tables 623 and 633. Another problem is that a failure of the CPU 61, if generated, results in the failure of the management of the LAG management tables 623 and 633.

SUMMARY OF THE DISCLOSURE

In view of the foregoing, it is an object of the present invention to solve the problems described above. More specifically, it is an object of the present invention to provide a communication device, a communication system, and a LAG management table management method used for the communication device and the communication system that can prevent frames from being sent to a failing port when the LAG management tables are inconsistent.

According to an aspect of the present invention, there is provided a communication device that has link aggregation management tables, one for each of a plurality of line cards, each of the link aggregation management tables managing a relation between a link aggregation group and ports belonging thereto. The communication device has a function, which makes statuses of the link aggregation management tables consistent, in each of the plurality of line cards.

A communication system of the present invention includes the communication device described above.

According to another aspect of the present invention, there is provided a LAG management table management method for use on a communication device having link aggregation management tables, one for each of a plurality of line cards, each of the link aggregation management tables managing a relation between a link aggregation group and ports belonging thereto. The communication device performs processing, which makes statuses of the link aggregation management tables consistent, in each of the plurality of line cards.

That is, in the communication device of the present invention, the link aggregation (hereinafter called LAG) management table is provided in each of the plurality of line cards. The communication device, which has the function that makes the statuses of LAG management tables consistent, solves the problem that a frame cannot be sent to a normal port when a failure is generated in a link constituting a LAG. As a result, the communication device makes it possible to create a LAG between line cards (i.e., inter-line card LAG).

Thus, the communication device of the present invention uses a distributed switch architecture in which a switching device, which has the LAG function that aggregates multiple physical links into one and the LAG management table that manages the relation between a LAG group and the ports belonging thereto, is distributed on a plurality of line cards to distribute the frame switch function on the line cards. This communication device provides the function for making the statuses of LAG management tables on the plurality of multiple line cards consistent (the function that establishes the synchronization of LAG management tables among line cards). Because this communication device can prevent a frame from being sent to a failing port when the LAG management tables become inconsistent, a LAG can be created across line cards.

The processing of the communication device of the present invention for making the LAG management tables consistent does not involve the CPU processing of the device control unit. Thus, there is neither a performance problem caused by the CPU processing nor a failure in the management of LAG management tables caused by a CPU failure.

In addition, when a failure is generated in a port belonging to a LAG group and the LAG management table of the frame transfer unit to which the port belongs is updated, the communication device of the present invention notifies the LAG management information to the other frame transfer units having the ports belonging to the LAG group for updating the LAG management tables. As a result, because the LAG management tables of the frame transfer units including the ports of the same LAG group can be made consistent, all frame transfer units can avoid sending a frame to a failing port and a LAG across three or more frame transfer units can also be configured.

The meritorious effects of the present invention are summarized as follows.

The configuration and the operation according to the present invention described above can prevent frames from being sent to a failing port when the LAG management tables become inconsistent.

BRIEF DESCRIPTION OF THE DRAWINGS

FIG. 5 is a diagram showing the management processing of a LAG management table in the related art.

PREFERRED MODES OF THE INVENTION

Next, one example of the present invention will be described with reference to the drawings.

First Example

Figure 1:
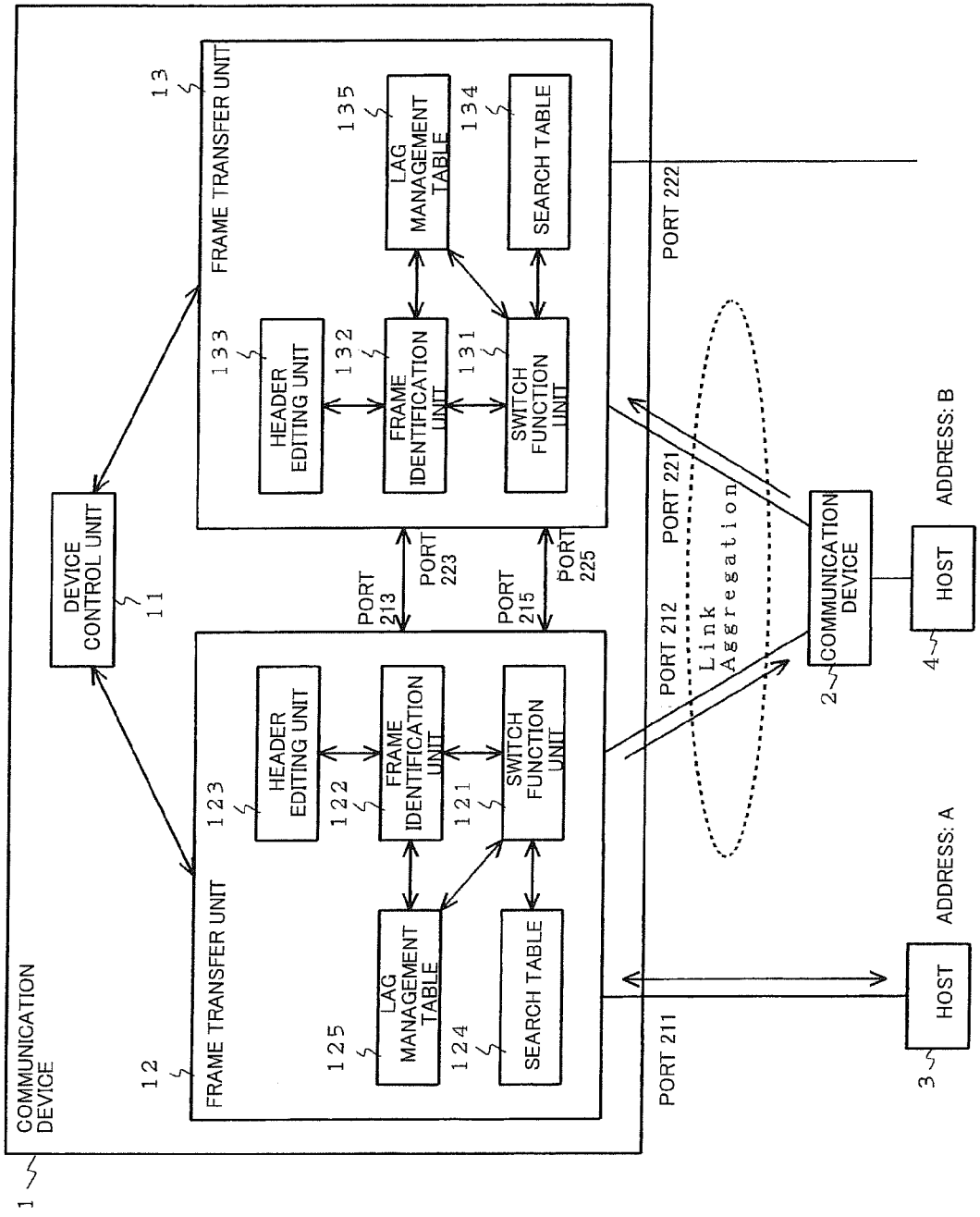
FIG. 1 is a block diagram showing the configuration of a communication system in one example of the present invention.

FIG. 1 is a block diagram showing the configuration of a communication system in one example of the present invention. Referring to FIG. 1, the communication system in one example of the present invention comprises communication devices 1 and 2 and host devices 3 and 4. The communication device 1 comprises a device control unit 11 and two frame transfer units 12 and 13 (for example, line cards). Because the two frame transfer units 12 and 13 have the same configuration and perform the same operation, the following describes the transfer from the frame transfer unit 12 to the frame transfer unit 13 and omits the description from the transfer from the frame transfer unit 13 to the frame transfer unit 12.

The frame transfer unit 12 comprises two ports (port 211 and 212) for connection to the communication device 2, which is external to the communication device 1, via a transmission medium for transferring frames to and from the communication device 2. The frame transfer unit 12 further comprises a port 213 via which frames are transferred to and from the frame transfer unit 13 for connection to the frame transfer unit 13 and a port 215 via which link aggregation (hereinafter referred to as LAG) management information is transferred. The frame transfer unit 12 further comprises a switch function unit 121, a frame identification unit 122, a header editing unit 123, a search table 124, and a LAG management table 125. The frame transfer unit 13 also comprises ports 221, 222, 223, and 225, a switch function unit 131, a frame identification unit 132, a header editing unit 133, a search table 134, and a LAG management table 135.

The switch function unit 121, which has the standard frame switch function, uses the destination address of a frame as the key to search the search table 124, composed of entries each of which is composed of a combination of an address and a port number, to determine an output port. An entry of the search table 124 has an aging timer and, when the elapsed time measured by the aging timer has reached a predetermined time, the entry is deleted. In the description below, an entry whose elapsed time has reached a predetermined time is called an aged-out entry.

The switch function unit 121 also checks if the source address of a received frame is registered in the search table 124 and, if the source address is not yet registered, registers (learns) the source address of the frame as well as the port via which the frame was received. If the source address of the received frame is already registered, the switch function unit 121 updates the aging timer of the corresponding entry.

In addition, the switch function unit 121 has the LAG management table 125 composed of entries each of which is composed of a LAG group number and the port numbers constituting the LAG concerned. The switch function unit 121 checks if the number of the output port, determined by searching the search table 124, is registered in the LAG management table 125. If the number of the determined output port is registered in any of the LAG group number entries, the switch function unit 121 selects one output port from port numbers registered in the entry, according to the distribution algorithm.

If the frame is a unicast frame and the input port and the output port determined by the switch function unit 121 belong to the same frame transfer unit 12, the switch function unit 121 transfers the frame to the frame identification unit 122.

If the frame is a unicast frame but the output port determined by the switch function unit 121 belongs to the frame transfer unit 13 that is the other frame transfer unit, the switch function unit 121 transfers the frame to the header editing unit 123.

In addition, if the frame is a broadcast frame, the switch function unit 121 outputs the frame to a port (excluding the port via which the frame was received) belonging to its own frame transfer unit (frame transfer unit 12) and, at the same time, transfers the frame to the header editing unit 123.

In the frame identification unit 122, references are made to the LAG management table 125, and it is identified if the input port or the output port, determined by the switch function unit 121, belongs to a link aggregation group. If one of the input port or the output port of the frame is a port belonging to a link aggregation, the frame identification unit 122 creates a copy (a duplicate) of the frame, outputs this frame from an output port determined by the switch function unit 121 and, at the same time, transfers the created copy frame to the header editing unit 123.

The header editing unit 123 creates a device-internal header composed of a field indicating whether the frame is a copy frame (hereinafter called a "copy field") and a field in which the input port number is stored, adds the created header to the frame, and transfers the frame to the other frame transfer unit 13 via the port 213.

For a frame received from the frame identification unit 122 (that may be, the copy frame described above), the header editing unit 123 sets the copy field and transfers the frame to the other frame transfer unit 13 via the port 213. In this case, because the data part of the copy frame is not necessary for the registration processing in the frame transfer unit 13 to which the frame is to be sent, the header editing unit 123 deletes the data part concerned. In this example, deleting the data part in this way reduces the amount of data transferred between the frame transfer unit 12 and the frame transfer unit 13, and the transmission bandwidth between the frame transfer unit 12 and the frame transfer unit 13, can be used efficiently.

For a frame received from the switch function unit 121, the header editing unit 123 does not set the copy field, but transfers the frame to the other frame transfer unit 13 via the port 213.

In the frame transfer unit 13 that receives a frame to which the device internal header is added, the switch function unit 131 checks if the source address of the frame is registered in the search table 134 in the same way as the frame transfer unit, from which the frame is received, performs the frame switch processing as described above. If the source address of the frame is not yet registered, the switch function unit 131 registers the address, as well as the input port number included in the device internal header, in the search table 134. If the source address of the frame is already registered, the switch function unit 131 updates the aging timer of the corresponding entry.

The frame transfer unit 13 references the copy field of the device-internal header and, if it is found that the frame is a copy frame, determines that the frame is received from the frame transfer unit 12 that is the source frame transfer unit, and discards the frame to prevent the frame from being sent doubly to the link aggregation port. If the frame is not a copy frame, the frame transfer unit 13 causes the switch function unit 131 to continue processing for determining the output port and output the frame to the determined output port.

As described above, each of the multiple frame transfer units 12 and 13 of the communication device 1 creates a copy of a frame that is determined to be sent or received via a port constituting a LAG, and transfers the created copy frame to the switch function unit of the other frame transfer unit. The communication device 1 has this function to make the status consistent between the search tables 124 and 134 that are managed independently by the frame transfer units 12 and 13.

When a failure is generated in a port belonging to a LAG group, the communication device 1 updates the LAG management table of the frame transfer unit to which the port belongs and, at the same time, notifies the LAG management information to the other frame transfer unit, which has a port belonging to the LAG group, via ports 215 and 225 to update the LAG management table. The communication device 1 has this function to make the statuses consistent between the LAG management tables 125 and 135 that are managed independently by the frame transfer units.

As described above, the communication device 1 comprises the multiple frame transfer units 12 and 13. The frame transfer units 12 and 13 have the search tables 124 and 134 respectively, which have entries each composed of an address and a port number, to determine the output port of each frame and the LAG management tables 125 and 135 respectively, which have entries each composed of a LAG group number and port numbers constituting the LAG concerned. At the same time, the frame transfer units 12 and 13 have the function to make the status consistent between those tables and have the switch functions. This configuration allows a link aggregation LAG to be created between the frame transfer units 12 and 13.

Figure 2:
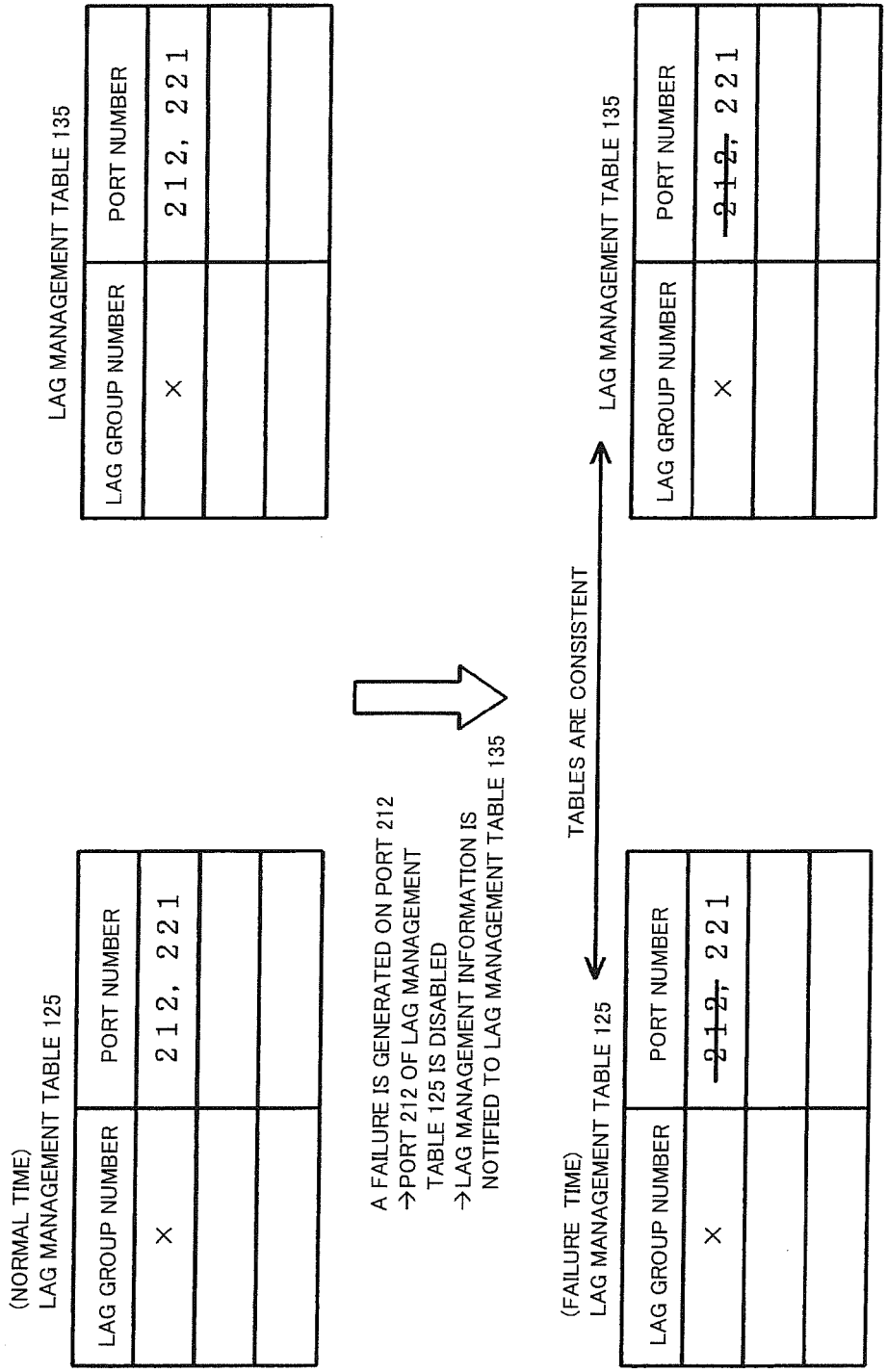
FIG. 2 is a diagram showing the management processing of a LAG management table in one example of the present invention.

FIG. 2 is a diagram showing how the LAG management tables 125 and 135 are managed in one example of the present invention. With reference to FIG. 1 and FIG. 2, the following describes the operation of the communication device 1 in one example of the present invention where the LAG management tables 125 and 135 are synchronized.

The host device 3 is connected directly to the port 211 of the frame transfer unit 12 of the communication device 1, and the port 212 of the frame transfer unit 12 and the port 221 of the frame transfer unit 13, which form a link aggregation, are connected to the communication device 2. It is assumed that the LAG group number X is assigned to this LAG. It is also assumed that the host device 4 is connected to the communication device 2 and that the addresses of the host devices 3 and 4 are 'A' and 'B' respectively.

When a LAG is configured for the communication device 2 on a link between ports 212 and 221, the correspondence between the LAG group number X and the ports 212 and 221 belonging to the LAG group is registered in the LAG management tables 125 and 135 as shown in the figure at the top (normal time) of FIG. 2. In this case, when a failure is generated on the link between the communication device 2 and the port 212, the port 212 is disabled from the entries of the LAG group number X of the LAG management table 125 and the LAG management table is updated as shown in the figure at the bottom (failure time) of FIG. 2.

In this case, the port 212 is removed from the output port entries (candidates for selection), from which the switch function unit 121 selects an output port according to the distribution algorithm, and the port 221 is selected. As a result, a frame addressed to the host device 4 is transferred to the frame transfer unit 13.

In addition, the LAG management information indicating that the port 212, which is an entry of the LAG group number X, has been disabled is notified to the frame transfer unit 13 via the port 215 and the port 225.

In the frame transfer unit 13, the port 212 is disabled from the entries of the LAG group number X of the LAG management table 135 according to the notified LAG management information and, as a result, the LAG management table 135 becomes consistent with the LAG management table 125. The switch function unit 131 outputs a frame to the output port 221 that is determined according to the LAG management table 135.

In this example, the LAG management information is notified between the frame transfer units 12 and 13 as described above to make the LAG management tables 125 and 135 consistent. This configuration allows a frame to be output from a port selected by the LAG function, and a LAG to be created between the different frame transfer units 12 and 13.

In this example, when the link between the communication device 2 and the port 212 recovers (i.e., link failure is removed), the port 212 that is an entry of the LAG group number X of the LAG management table 125 is enabled, and the LAG management table 125 returns to the status shown in the upper part of FIG. 2. In this case, the LAG management information indicating that the port 212 has been enabled is notified to the frame transfer unit 13 via the ports 215 and 225.

In the frame transfer unit 13, the port 212 that is an entry of the LAG group number X of the LAG management table 135 is enabled according to the notified LAG management information to make the content of the LAG management table 135 consistent with that of the LAG management table 125.

For use in the distributed switch architecture, the function is provided in this example for making the status consistent between the LAG management tables 125 and 135 of the multiple frame transfer units 12 and 13 (line cards) as described above, so that even when the LAG management tables 125 and 135 become inconsistent, this function prevents a frame from being sent to a failing port, thus allowing a LAG to be created between the frame transfer units 12 and 13 (line cards).

In addition, the processing in this example for making the LAG management tables 125 and 135 consistent does not involve the CPU processing of the device control unit 11. Thus, there is neither a performance problem caused by the CPU processing nor a failure in the management of LAG management tables 125 and 135 caused by a CPU failure.

Second Example

Figure 3:
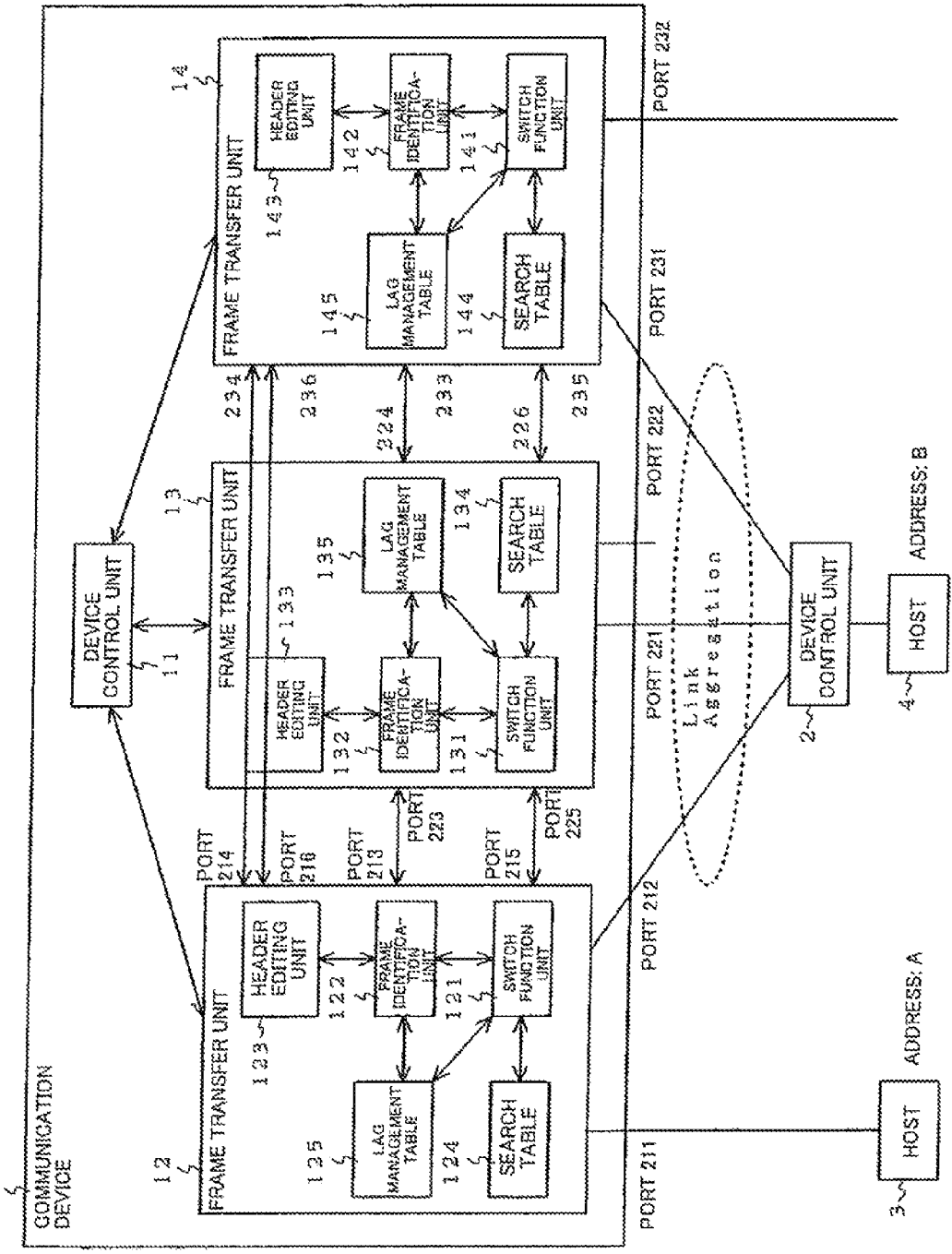
FIG. 3 is a block diagram showing the configuration of a communication system in another example of the present invention.
Figure 4:
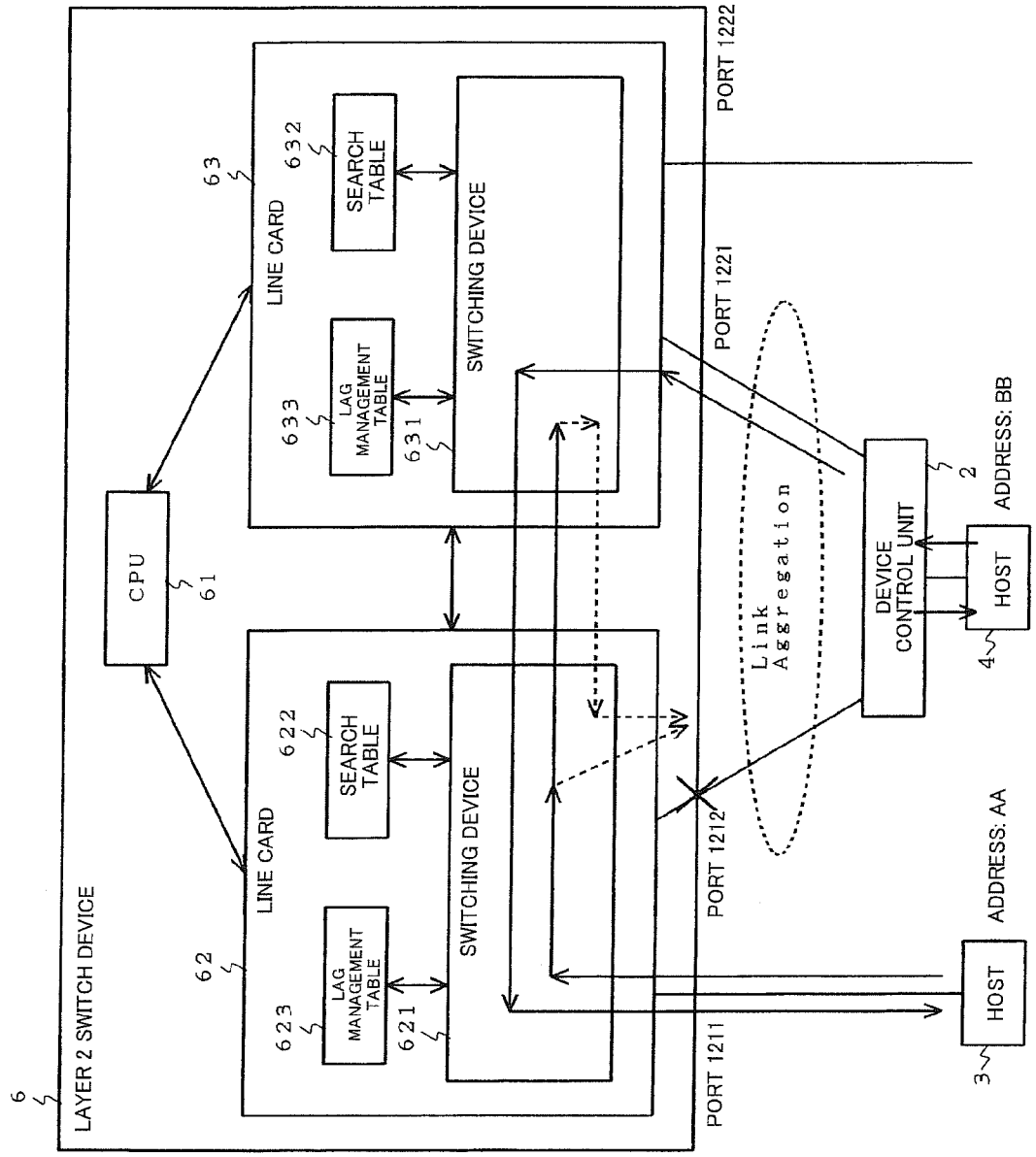
FIG. 4 is a block diagram showing the configuration of a communication system in the related art.

FIG. 3 is a block diagram showing a configuration of a communication system in other example of the present invention. Referring to FIG. 3, the another example of the present invention has the same configuration as that of the example shown in FIG. 1 except that a frame transfer unit 14 is added to a communication device 1a, and the same reference numerals are used to denote the same elements.

When a LAG is configured across three or more frame transfer units 12-14, which of the ports of the frame transfer units 12-14 constituting the LAG is to be used for the transmission of a frame is determined according to the distribution algorithm, and any of those ports can be a transmission port. This means that LAG management tables 125, 135, and 145 of all frame transfer units 12-14, which include the ports belonging to the LAG group, must be consistent.

To satisfy this requirement, a function is added to the frame transfer units 12-14 in one example of the present invention described above to notify the LAG management information to all frame transfer units that have the same LAG group number entry.

When a failure is generated in a port belonging to one LAG group and a LAG management table of any one frame transfer unit to which the port belongs is updated, the LAG management information is notified to the other frame transfer units having a port belonging to the LAG group for updating the LAG management tables.

In this example, updating the LAG management tables in this way allows the LAG management tables 125, 135, and 145 of the frame transfer units 12-14, which include a port belonging to the same LAG group, to be made consistent. This configuration allows any of the frame transfer units 12-14 to avoid the transmission of a frame to a failing port, thus making it possible to configure a LAG across three or more frame transfer units 12-14.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A communication device comprising:
    a plurality of line cards having a plurality of ports, the ports organized over a plurality of link aggregation groups;
    link aggregation management tables, one for each line card, each of said link aggregation management tables managing a relation between one of the link aggregation groups and the ports belonging to the one of the link aggregation groups; and,
    components corresponding to and within the line cards to make statuses of the link aggregation management tables consistent,
    wherein, only when a failure is generated in a port belonging to a link aggregation group and a link aggregation management table of a given line card to which the port belongs is updated, the component of the given line card notifies link aggregation management information to other line cards having ports belonging to the link aggregation group, to update the link aggregation management tables of the other line cards, such that when no failure is generated, the component does not notify the link aggregation management information to the other line cards having ports belong to the link aggregation group.

2. The communication device as defined by claim 1 wherein said communication device uses a distributed switch architecture in which a switching device is provided on said plurality of line cards and a frame switch function is distributedly provided on said plurality of line cards, said switching device having a link aggregation function to aggregate a plurality of links into one and the link aggregation management table.

3. A communication system including the communication device as defined by claim 1.

4. A communication system including the communication device as defined by claim 2.

5. The communication device as defined by claim 1, wherein the ports belonging to the link aggregation group comprises a plurality of ports, such that the link aggregation group includes the plurality of ports and such that the plurality of ports are aggregated into a single communication link.

6. The communication device as defined by claim 1, wherein the link aggregation management table for each line card stores identical information regarding the ports belonging to the link aggregation group.

7. The communication device as defined by claim 1, wherein the line cards are linked within the link aggregation group in a non-centralized, distributed manner.

* * * * *